United States Patent
Lee et al.

(10) Patent No.: US 9,979,967 B2
(45) Date of Patent: *May 22, 2018

(54) ADAPTIVE TRANSFORM METHOD BASED ON IN-SCREEN PREDICTION AND APPARATUS USING THE METHOD

(71) Applicant: KT CORPORATION, Kyeonggi-do (KR)

(72) Inventors: Bae Keun Lee, Gyeonggi-do (KR); Jae Cheol Kwon, Daejeon (KR); Joo Young Kim, Gyeonggi-do (KR)

(73) Assignee: KT CORPORATION, Kyeonggi-do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/287,944

(22) Filed: Oct. 7, 2016

(65) Prior Publication Data

US 2017/0026644 A1    Jan. 26, 2017

Related U.S. Application Data

(63) Continuation of application No. 15/017,210, filed on Feb. 5, 2016, now Pat. No. 9,736,480, which is a
(Continued)

(30) Foreign Application Priority Data

Oct. 17, 2011    (KR) .......................... 10-2011-0106048

(51) Int. Cl.
*H04N 19/00*    (2014.01)
*H04N 19/11*    (2014.01)
(Continued)

(52) U.S. Cl.
CPC ............. *H04N 19/12* (2014.11); *H04N 19/11* (2014.11); *H04N 19/122* (2014.11);
(Continued)

(58) Field of Classification Search
None
See application file for complete search history.

(56) References Cited

U.S. PATENT DOCUMENTS 6,157,676 A * 12/2000 Takaoka ............... H04N 19/593
348/409.1
7,120,305 B2    10/2006 Berkner
(Continued)

FOREIGN PATENT DOCUMENTS

CN    101584219 A    11/2009
CN    102138326 A    7/2011
(Continued)

OTHER PUBLICATIONS

Korean Intellectual Property Office, International Search Report for International Application No. PCT/KR2012/006118, dated Feb. 13, 2013.
(Continued)

*Primary Examiner* — Reza Aghevli
(74) *Attorney, Agent, or Firm* — IP Legal Services, LLC

(57) ABSTRACT

Disclosed is an adaptive transform method based on an in-screen prediction, and an apparatus using the method. A method for encoding an image can comprise a step of determining in-screen prediction mode groups, and a step of transforming by using a different transform method according to the in-screen prediction mode group. As a result, transforming can be performed by applying the different transform method according to the in-screen prediction mode group.

4 Claims, 10 Drawing Sheets

Related U.S. Application Data continuation of application No. 14/353,287, filed as application No. PCT/KR2012/006118 on Aug. 1, 2012, now Pat. No. 9,294,774.

(51) Int. Cl.

| | | |
|---|---|---|
| *H04N 19/122* | (2014.01) | |
| *H04N 19/129* | (2014.01) | |
| *H04N 19/159* | (2014.01) | |
| *H04N 19/176* | (2014.01) | |
| *H04N 19/593* | (2014.01) | |
| *H04N 19/12* | (2014.01) | |
| *H04N 19/44* | (2014.01) | |
| *H04N 19/124* | (2014.01) | |
| *H04N 19/61* | (2014.01) | |
| *H04N 19/625* | (2014.01) | |
| *H04N 19/86* | (2014.01) | |
| *H04N 19/91* | (2014.01) | |

(52) U.S. Cl.
CPC ......... *H04N 19/124* (2014.11); *H04N 19/129* (2014.11); *H04N 19/159* (2014.11); *H04N 19/176* (2014.11); *H04N 19/44* (2014.11); *H04N 19/593* (2014.11); *H04N 19/61* (2014.11); *H04N 19/625* (2014.11); *H04N 19/86* (2014.11); *H04N 19/91* (2014.11)

(56) References Cited

U.S. PATENT DOCUMENTS

| | | | |
|---|---|---|---|
| 7,830,963 | B2 | 11/2010 | Holcomb |
| 8,249,147 | B2 | 8/2012 | Watanabe et al. |
| 8,520,960 | B2 | 8/2013 | Francois et al. |
| 8,605,784 | B2 | 12/2013 | Min et al. |
| 8,711,950 | B2 | 4/2014 | Minamoto |
| 2003/0194150 | A1 | 10/2003 | Berkner |
| 2005/0271288 | A1 | 12/2005 | Suzuki et al. |
| 2006/0291556 | A1 | 12/2006 | Watanabe et al. |
| 2007/0109409 | A1* | 5/2007 | Yea ........................ H04N 7/181 348/153 |
| 2008/0123977 | A1 | 5/2008 | Moriya et al. |
| 2008/0175317 | A1 | 7/2008 | Han et al. |
| 2008/0310504 | A1 | 12/2008 | Ye et al. |
| 2009/0110067 | A1 | 4/2009 | Sekiguchi et al. |
| 2009/0190829 | A1 | 7/2009 | Suzuki et al. |
| 2009/0207911 | A1 | 8/2009 | Minamoto |
| 2009/0238271 | A1 | 9/2009 | Kim et al. |
| 2010/0054619 | A1 | 3/2010 | Alshin et al. |
| 2010/0166070 | A1 | 7/2010 | Goel |
| 2010/0220790 | A1* | 9/2010 | Jeon ........................ H04N 19/55 375/240.16 |
| 2010/0290524 | A1 | 11/2010 | Lu et al. |
| 2011/0026844 | A1 | 2/2011 | Francois et al. |
| 2011/0030369 | A1* | 2/2011 | Natali ........................ G01D 5/145 60/602 |
| 2011/0038415 | A1 | 2/2011 | Min et al. |
| 2011/0090969 | A1 | 4/2011 | Sung et al. |
| 2011/0103486 | A1* | 5/2011 | Sato ........................ H04N 19/176 375/240.16 |
| 2011/0122947 | A1 | 5/2011 | Suzuki et al. |
| 2011/0123103 | A1 | 5/2011 | Suzuki et al. |
| 2011/0123104 | A1 | 5/2011 | Suzuki et al. |
| 2011/0123105 | A1 | 5/2011 | Suzuki et al. |
| 2011/0123106 | A1 | 5/2011 | Suzuki et al. |
| 2011/0123107 | A1 | 5/2011 | Suzuki et al. |
| 2011/0123108 | A1 | 5/2011 | Suzuki et al. |
| 2011/0123109 | A1 | 5/2011 | Suzuki et al. |
| 2011/0200113 | A1 | 8/2011 | Kim et al. |
| 2011/0310969 | A1 | 12/2011 | Park et al. |
| 2012/0008675 | A1 | 1/2012 | Karczewicz et al. |
| 2012/0008682 | A1 | 1/2012 | Karczewicz et al. |
| 2012/0008683 | A1* | 1/2012 | Karczewicz ......... H04N 19/159 375/240.12 |
| 2012/0014431 | A1 | 1/2012 | Zhao et al. |
| 2012/0051421 | A1 | 3/2012 | Lu et al. |
| 2012/0121167 | A1 | 5/2012 | Atoyan |
| 2012/0140821 | A1 | 6/2012 | Drugeon et al. |
| 2012/0170649 | A1 | 7/2012 | Chen et al. |
| 2012/0201300 | A1 | 8/2012 | Kim et al. |
| 2012/0301040 | A1 | 11/2012 | Yie et al. |
| 2013/0039421 | A1* | 2/2013 | Lee ...................... H04N 19/593 375/240.13 |
| 2013/0148726 | A1 | 6/2013 | Han et al. |
| 2013/0177079 | A1* | 7/2013 | Kim ...................... H04N 19/96 375/240.12 |
| 2014/0056362 | A1 | 2/2014 | Mrak et al. |
| 2014/0198848 | A1 | 7/2014 | Yie et al. |
| 2015/0043631 | A1 | 2/2015 | Yie et al. |
| 2015/0043632 | A1 | 2/2015 | Yie et al. |
| 2015/0043640 | A1 | 2/2015 | Yie et al. |
| 2015/0043643 | A1 | 2/2015 | Yie et al. |
| 2015/0229924 | A1 | 8/2015 | Kim et al. |
| 2016/0029023 | A1 | 1/2016 | Kim et al. |
| 2017/0238015 | A1 | 8/2017 | Karczewicz et al. |

FOREIGN PATENT DOCUMENTS

| | | |
|---|---|---|
| EP | 2680585 A2 | 1/2014 |
| EP | 2753081 A2 | 7/2017 |
| GB | 2492333 A | 1/2013 |
| JP | 11-055678 A | 2/1999 |
| JP | 2009-272727 A | 11/2009 |
| KR | 10-2008-0026463 A | 3/2008 |
| KR | 10-2009-0072150 A | 7/2009 |
| KR | 10-2010-0018191 A | 2/2010 |
| KR | 10-2010-0042542 A | 4/2010 |
| RU | 2350041 C2 | 3/2009 |
| WO | 2010/134963 A1 | 11/2010 |
| WO | 2011/009196 A1 | 1/2011 |
| WO | 2011/031044 A2 | 3/2011 |
| WO | 2011/126349 A2 | 10/2011 |

OTHER PUBLICATIONS

Korean Intellectual Property Office, Written Opinion of the International Searching Authority for International Application No. PCT/KR2012/006118, dated Feb. 13, 2013.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11 5th Meeting: Geneva, CH, Mar. 16-23, 2011, Document: JCTVC-E603.

Yunfei Zheng, "CE11: Mode Dependent Coefficient Scanning", Joint Collaborative Team on Video Coding (JCT-VC) of ITU-T SG16 WP3 and ISO/IEC JTC1/SC29/WG11 4th Meeting: Daegu, KR, Jan. 20-28, 2011, Document: JCTVC-D393.

Marta Mrak et al., "Transform skip mode", Joint Collaborative Team on Video Coding (JCT-VC) of ITU-T SG16 WP3 and ISO/IEC JTC1/SC29/WG11 6th Meeting: Torino, IT, Jul. 14-22, 2011, Document: JCTVC-F077_r1.

* cited by examiner horizontal scanning
(800)

vertical scanning
(820)

diagonal scanning
(840)

diagonal scanning
(860)

ADAPTIVE TRANSFORM METHOD BASED ON IN-SCREEN PREDICTION AND APPARATUS USING THE METHOD

CROSS REFERENCE TO RELATED APPLICATIONS

The application is a Continuation of U.S. patent application Ser. No. 15/017,210 (filed on Feb. 5, 2016), which is a Continuation of U.S. patent application Ser. No. 14/353,287 (filed on Apr. 21, 2014), now issued as U.S. Pat. No. 9,294,774, which is a National Stage Patent Application of PCT International Patent Application No. PCT/KR2012/006118 (filed on Aug. 1, 2012) under 35 U.S.C. § 371, which claims priority to Korean Patent Application No. 10-2011-0106048 (filed on Oct. 17, 2011), the teachings of which are incorporated herein in their entireties by reference.

TECHNICAL FIELD

The present invention relates to an adaptive transform method based on an intra prediction mode and an apparatus using the same, and more particularly, to an encoding/decoding method and apparatus.

BACKGROUND ART

Recently, demands for high-resolution and high-quality videos, such as high-definition (HD) and ultrahigh-definition (UHD) videos, have increased in various fields of applications. As video data has higher resolution and higher quality, the amount of data more increases relative to existing video data. Accordingly, when video data is transferred using media such as existing wired and wireless broad band lines or is stored in existing storage media, transfer cost and storage cost increase. In order to solve these problems occurring with an increase in resolution and quality of video data, high-efficiency video compression techniques may be utilized.

Video compression technology include various techniques, such as an inter prediction technique of predicting pixel values included in a current picture from previous or subsequent pictures of the current picture, an intra prediction technique of predicting pixel values included in a current picture using pixel information in the current picture, and an entropy encoding technique of assigning a short code to a value with a high appearance frequency and assigning a long code to a value with a low appearance frequency. Video data may be effectively compressed and transferred or stored using such video compression techniques.

DISCLOSURE

Technical Problem

An aspect of the present invention is to provide a method of adaptively changing a transform mode based on an intra prediction mode to improve efficiency of video coding.

Another aspect of the present invention is to provide a method of adaptively changing a scanning method based on an intra prediction mode to improve efficiency of video coding.

Still another aspect of the present invention is to provide an apparatus for performing a method of adaptively changing a transform mode based on an intra prediction mode to improve efficiency of video coding.

Yet another aspect of the present invention is to provide an apparatus for performing a method of adaptively changing a scanning method based on an intra prediction mode to improve efficiency of video coding efficiency.

Technical Solution

An embodiment of the present invention provides a video decoding method including determining an intra prediction mode of a block, and inverse-transforming the block using a different inverse transform method depending on the intra prediction mode of the block. The determining of the intra prediction mode of the block may determine which intra prediction mode group the intra prediction mode of the block is included in among a first intra prediction mode group including a vertical prediction mode, a second intra prediction mode group including a horizontal prediction mode, and a third intra prediction mode group including any directional prediction mode other than the first intra prediction mode group and the second intra prediction mode group. The inverse-transforming of the block using the different inverse transform method depending on the intra prediction mode of the block may divide the intra prediction mode of the block into a plurality of prediction mode groups and determine an inverse transform method depending on the prediction mode groups. The video decoding method may further include determining whether to perform inverse transform on the block by decoding flag information to determine whether to perform inverse transform on the block.

Another embodiment of the present invention provides a video decoding method including determining an intra prediction mode of a block, and determining a scanning order depending on the intra prediction mode of the block. The determining of the scanning order depending on the intra prediction mode of the block may divide the intra prediction mode of the block into a plurality of prediction mode groups and determine a scanning order depending on the prediction mode groups.

Still another embodiment of the present invention provides an video encoding method including determining an intra prediction mode of a block, and transforming the block using a different transform method depending on the intra prediction mode of the block. The transforming of the block using the different transform method depending on the intra prediction mode of the block may divide the intra prediction mode of the block into a plurality of prediction mode groups and determine a transform method depending on the prediction mode groups. The video encoding method may further include determining whether to transform the block and encoding information on whether to transform the block.

Yet another embodiment of the present invention provides a video encoding method including determining an intra prediction mode of a block, and determining a scanning order depending on the intra prediction mode of the block. The determining of the scanning order depending on the intra prediction mode of the block may divide the intra prediction mode of the block into a plurality of prediction mode groups and determine a scanning order depending on the prediction mode groups.

Still another embodiment of the present invention provides a video decoding apparatus including an entropy decoding module to decode information on an intra prediction mode, and an inverse transform module to inverse-transform a block using a different inverse transform method based on the intra prediction mode decoded by the entropy decoding module. The inverse transform module may determine an inverse transform method depending on the intra prediction mode of the block divided into a plurality of prediction mode groups. The entropy decoding module may decode flag information to determine whether to perform inverse transform on the block.

Yet another embodiment of the present invention provides a video decoding apparatus including an entropy decoding module to decode information on an intra prediction mode, and a rearrangement module to scan a coefficient based on a scanning order determined on the intra prediction mode decoded by the entropy decoding module. The rearrangement module may perform scanning based on the intra prediction mode of the block divided into a plurality of prediction mode groups.

Still another embodiment of the present invention provides a video encoding apparatus including a prediction module to determine an intra prediction mode of a block, and a transform module to transform the block using a different transform method depending on the intra prediction mode of the block. The transform module may divide the intra prediction mode of the block into a plurality of prediction mode groups and determine a transform method depending on the prediction mode groups. The transform module may determine whether to transform the block.

Yet another embodiment of the present invention provides a video encoding apparatus including a prediction module to determine an intra prediction mode of a block, and a rearrangement module to scan and rearrange a coefficient of the block based on a scanning order determined on the intra prediction mode of the block.

Advantageous Effects

According to exemplary embodiments of the present invention, an adaptive transform method based on an intra prediction mode and an apparatus using the same may divide intra prediction modes into groups and perform transform using different transform methods depending on the intra prediction modes. Thus, operation complexity may be reduced and efficient transform may be achieved.

MODE FOR INVENTION

Figure 1:
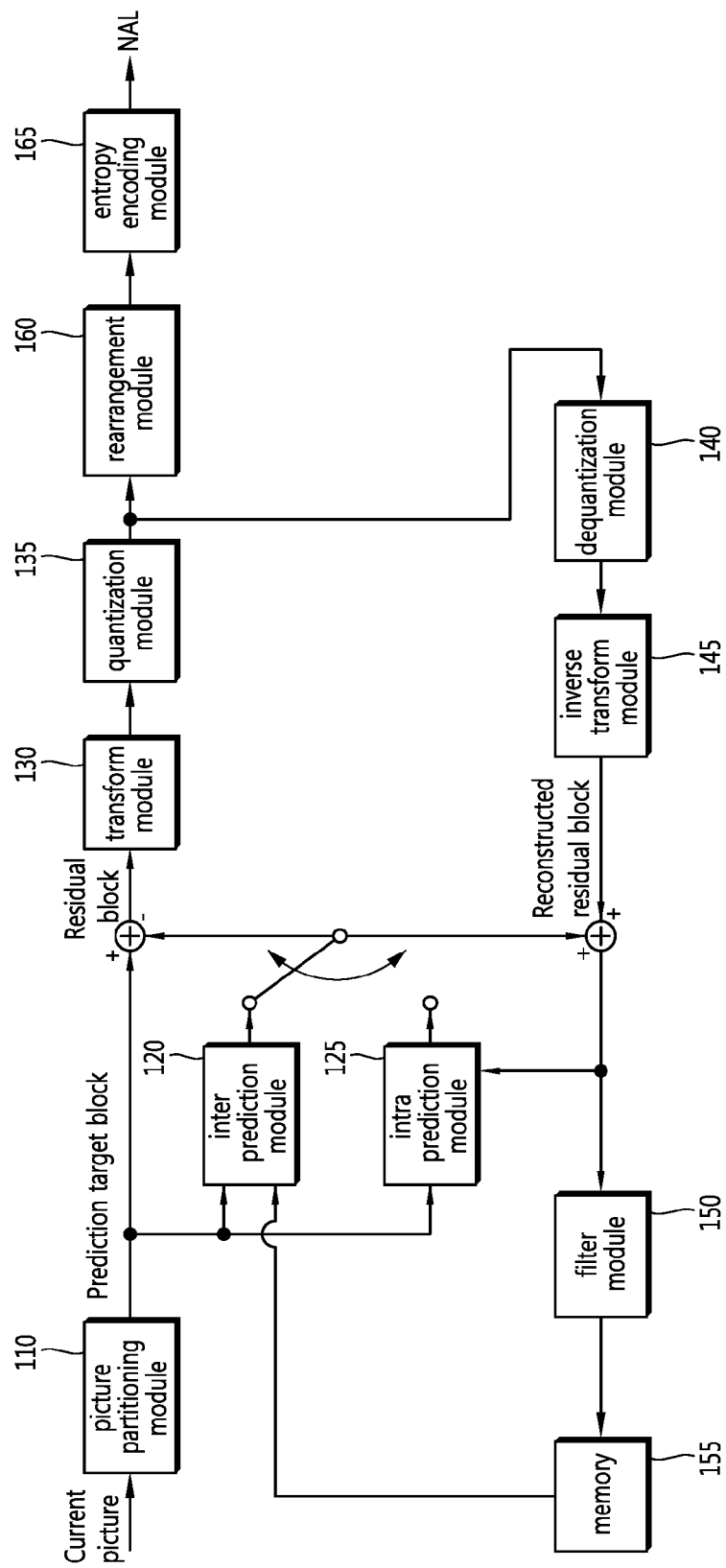
FIG. 1 is a block diagram illustrating a video encoding apparatus according to an exemplary embodiment of the present invention.

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a video encoding apparatus according to an exemplary embodiment of the present invention.

Referring to FIG. 1, the video encoding apparatus 100 includes a picture partitioning module 105, a prediction module 110, a transform module 115, a quantization module 120, a rearrangement module 125, an entropy encoding module 130, a dequantization module 135, an inverse transform module 140, a filter module 145 and a memory 150.

Although elements illustrated in FIG. 1 are independently shown so as to represent different distinctive functions in the video encoding apparatus, such a configuration does not indicate that each element is constructed by a separate hardware constituent or software constituent. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements may not be essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture partitioning module 105 may partition an input picture into at least one process unit. Here, the process unit may be a prediction unit (PU), a transform unit (TU) or a coding unit (CU). The picture partitioning module 105 may partition one picture into a plurality of combinations of coding units, prediction units and transform units and select one combination of coding units, prediction units and transform units on the basis of a predetermined criterion (for example, a cost function), thereby encoding the picture.

For example, one picture may be partitioned into a plurality of coding units. A recursive tree structure such as a quad tree structure may be used to partition a picture into coding units. Being a picture or a coding unit of a maximum size as root, a coding unit may be partitioned into sub-coding units with as many child nodes as the partitioned coding units. A coding unit which is not partitioned any more in accordance with a predetermined constraint is to be a leaf node. That is, assuming that a coding unit may be partitioned into quadrates only, a single coding unit may be partitioned into at most four different coding units.

In the embodiments of the invention, a coding unit may be used to refer to not only a unit of encoding but also a unit of decoding.

A prediction unit may be partitioned into at least one square or rectangular form with the same size in a coding unit or be partitioned such that a shape of partitioned prediction unit is different from a shape of other prediction unit in a coding unit.

When a prediction unit to be subjected to intra prediction is generated based on a coding unit and the coding unit is not a minimum coding unit, intra prediction may be performed without partitioning the coding unit into plural prediction units (N×N).

The prediction module 110 may include an inter prediction module to perform inter prediction and an intra prediction module to perform intra prediction. The prediction module 110 may determine which of inter prediction or intra prediction should be performed on a prediction unit, and may determine specific information (for example, intra prediction mode, motion vector, and reference picture, etc) according to the determined prediction method. Here, a process unit on which prediction is performed may be different from a process unit for which a prediction method and specific information are determined. For example, a prediction method and a prediction mode may be determined for each prediction unit, while prediction may be performed for each transform unit. A residual value (residual block) between a generated predicted block and an original block may be input to the transform module 115. Further, prediction mode information, motion vector information and the like used for prediction may be encoded along with the residual value by the entropy encoding module 130 and be transmitted to the decoding apparatus. When a specific encoding mode is used, the original block may be encoded and transmitted to the decoding apparatus without generating a predicted block through the prediction module 110.

The inter prediction module may predict for a prediction unit on the basis of information on at least one picture among a previous picture and a subsequent picture of a current picture. The inter prediction module may include a reference picture interpolation module, a motion prediction module, and a motion compensation module.

The reference picture interpolation module may be supplied with reference picture information from the memory 150 and generate pixel information less than an integer pixel position unit (an integer pixel unit or a pixel unit) from a reference picture. In the case of luma pixels, a DCT-based 8-tap interpolation filter having a varying filter coefficient may be used to generate pixel information less than an integer pixel unit in a unit of ¼ pixel position (a unit of ¼ pixel). In the case of chroma pixels, a DCT-based 4-tap interpolation filter having a varying filter coefficient may be used to generate pixel information less than an integer pixel unit in a unit of ⅛ pixel position (a unit of ⅛ pixel).

The motion prediction module may perform motion prediction on the basis of the reference picture interpolated by the reference picture interpolation module. Various methods, such as a full search-based block matching algorithm (FBMA), a three-step search (TSS) algorithm and a new three-step search (NTS) algorithm, may be used to calculate a motion vector. A motion vector may have a motion vector value in a unit of ½ or ¼ pixel on the basis of an interpolated pixel. The motion prediction module may perform a prediction on a current prediction unit using different motion prediction methods. Various methods, such as skipping, merging, and advanced motion vector prediction (AMVP) etc, may be used as the motion prediction method.

The intra prediction module may generate a prediction block based on reference pixel information neighboring to a current block which is pixel information in a current picture. When a block neighboring to a current prediction unit is a block having been subjected to inter prediction and a reference pixel is a pixel having been subjected to inter prediction, reference pixel information included in the block having been subjected to inter prediction may be substituted with reference pixel information in a block having been subjected to intra prediction. That is, when a reference pixel is not available, information on the unavailable reference pixel may be substituted with at least one reference pixel of the available reference pixels.

A prediction mode of intra prediction may include a directional prediction mode in which reference pixel information is used according to a prediction direction and a non-directional prediction mode in which direction information is not used in performing prediction. A mode for predicting luma information and a mode for predicting chroma information may be different from each other. Intra prediction mode information used to obtain luma information or predicted luma signal information may be used to predict chroma information.

When a prediction unit and a transform unit have the same size in performing intra prediction, intra prediction on the prediction unit may be performed based on left pixels, an upper-left pixel and upper pixels of the prediction unit. On the other hand, when a prediction unit and a transform unit have different sizes in performing intra prediction, intra prediction may be performed using reference pixels based on the transform unit. Intra prediction with N×N partitioning may be performed only on a minimum coding unit.

In the intra prediction method, an adaptive intra smoothing (AIS) filter may be applied to reference pixels according to the prediction mode prior to generation of a predicted block. Different types of AIS filters may be applied to the reference pixels. In the intra prediction method, the intra prediction mode of a current prediction unit may be predicted from an intra prediction mode of a prediction unit located neighboring to the current prediction unit. In predicting for the prediction mode of the current prediction unit using mode information predicted from a neighboring prediction unit, when the current prediction unit and the neighboring prediction unit have the same intra prediction mode, information indicating that the current prediction unit and the neighboring prediction unit have the same prediction mode may be transmitted using predetermined flag information. If the current prediction unit and the neighboring prediction unit have different prediction modes, information on the prediction mode of the current block may be encoded by entropy encoding.

A residual block including residual information which is a difference between the predicted block and the original block of the prediction unit may be generated based on the prediction unit by the prediction module 110. The generated residual block may be input to the transform module 115. The transform module 115 may transform the residual block including the residual information of the prediction unit generated based on the original block by the prediction module 110 using a transform method such as Discrete Cosine Transform (DCT) or Discrete Sine Transform (DST). A transform method to be used to transform the residual block may be determined among DCT and DST on the basis of the intra prediction mode information of the prediction unit used to generate the residual block.

An intra prediction mode for a current transform unit may be divided into a first intra prediction mode group including a vertical prediction mode, a second intra prediction mode group including a horizontal prediction mode, and a third intra prediction mode group including any directional prediction mode other than the first intra prediction mode group and the second intra prediction mode group. The transform module 115 may determine an intra prediction mode group and perform transformation using different transform methods depending on intra prediction mode groups.

The quantization module 120 may quantize values transformed into a frequency domain by the transform module 115. A quantization parameter may change depending on a block or importance of a picture. Values output from the quantization module 120 may be provided to the dequantization module 135 and the rearrangement module 125.

For the quantized residual values, the rearrangement module 125 may rearrange coefficients.

The rearrangement module 125 may change a two-dimensional (2D) block of coefficients into a one-dimensional (1D) vector of coefficients through coefficient scanning. For example, the rearrangement module 125 may change a 2D block of coefficients into a 1D vector of coefficients using diagonal scanning. Vertical scanning for scanning a 2D block of coefficients in a column direction and horizontal scanning for scanning a 2D block of coefficients in a row direction may be used depending on a size of a transform unit and an intra prediction mode, instead of diagonal scanning. That is, a scanning method for use may be selected based on the size of the transform unit and the intra prediction mode among diagonal scanning, vertical scanning, and horizontal scanning.

The entropy encoding module 130 may perform entropy encoding on the basis of the values obtained by the rearrangement module 125. Various encoding methods, such as exponential Golomb coding, context-adaptive variable length coding (CAVLC), and context-adaptive binary arithmetic coding (CABAC), may be used for entropy encoding.

The entropy encoding module 130 may encode a variety of information, such as residual coefficient information and block type information on a coding unit, prediction mode information, partitioning unit information, prediction unit information, transfer unit information, motion vector information, reference frame information, block interpolation information and filtering information which may be obtained from the rearrangement module 125 and the prediction module 110.

The entropy encoding module 130 may entropy-encode coefficients of a coding unit input from the rearrangement module 125.

The entropy encoding module 130 may store a table for entropy encoding, such as a variable-length coding (VLC) table, and entropy-encode using the VLC table. In entropy encoding, a method of using a counter for some codewords included in the table or direct swapping method may be used to change assignment of a codeword to a code number of information. For instance, in higher code numbers to which short-bit codewords is assigned in a table mapping a code number and a codeword, mapping order of the table mapping the codeword and the code number may be adaptively changed so as to assign a short-length codeword to a code number having a highest number of counting times of code numbers using a counter. When a number of counting times by the counter is a preset threshold, the number of counting times recorded in the counter may be divided in half, followed by counting again.

A code number in the table which is not counted may be subjected to entropy encoding by reducing a bit number assigned to the code number via a method of swapping a position with a right higher code number using the direct swapping method when information corresponding to the code number occurs.

The entropy encoding module may use different mapping tables for encoding a transform method depending on the intra prediction mode groups.

The dequantization module 135 and the inverse transform module 140 dequantize the values quantized by the quantization module 120 and inversely transform the values transformed by the transform module 115. The residual values generated by the dequantization module 135 and the inverse transform module 140 may be added to the predicted block, which is predicted by the motion prediction module, the motion compensation module, and the intra prediction module of the prediction module 110, thereby generating a reconstructed block.

The filter module 145 may include at least one of a deblocking filter, an offset correction module, and an adaptive loop filter (ALF).

The deblocking filter 145 may remove block distortion generated at boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. In addition, when horizontal filtering and vertical filtering are performed in applying the deblocking filter, the horizontal filtering and vertical filtering may be performed in parallel.

The offset correction module may correct an offset of the deblocking filtered picture from the original picture by a pixel. A method of partitioning pixels of a picture into a predetermined number of regions, determining a region to be subjected to offset correction, and applying offset correction to the determined region or a method of applying offset correction in consideration of edge information on each pixel may be used to perform offset correction on a specific picture.

The ALF may perform filtering based on a comparison result of the filtered reconstructed picture and the original picture. Pixels included in a picture may be partitioned into predetermined groups, a filter to be applied to each group may be determined, and differential filtering may be performed for each group. Information on whether to apply the ALF may be transferred by each coding unit (CU) and a shape and coefficient of an ALF to be applied to each block may vary. The ALF may have various types and a number of coefficients included in a corresponding filter may vary. Filtering-related information on the ALF, such as filter coefficient information, ALF ON/OFF information, and filter type information, may be included and transferred in a predetermined parameter set of a bitstream.

The memory 150 may store a reconstructed block or picture output from the filter module 145, and the stored reconstructed block or picture may be provided to the prediction module 110 when performing inter prediction.

Figure 2:
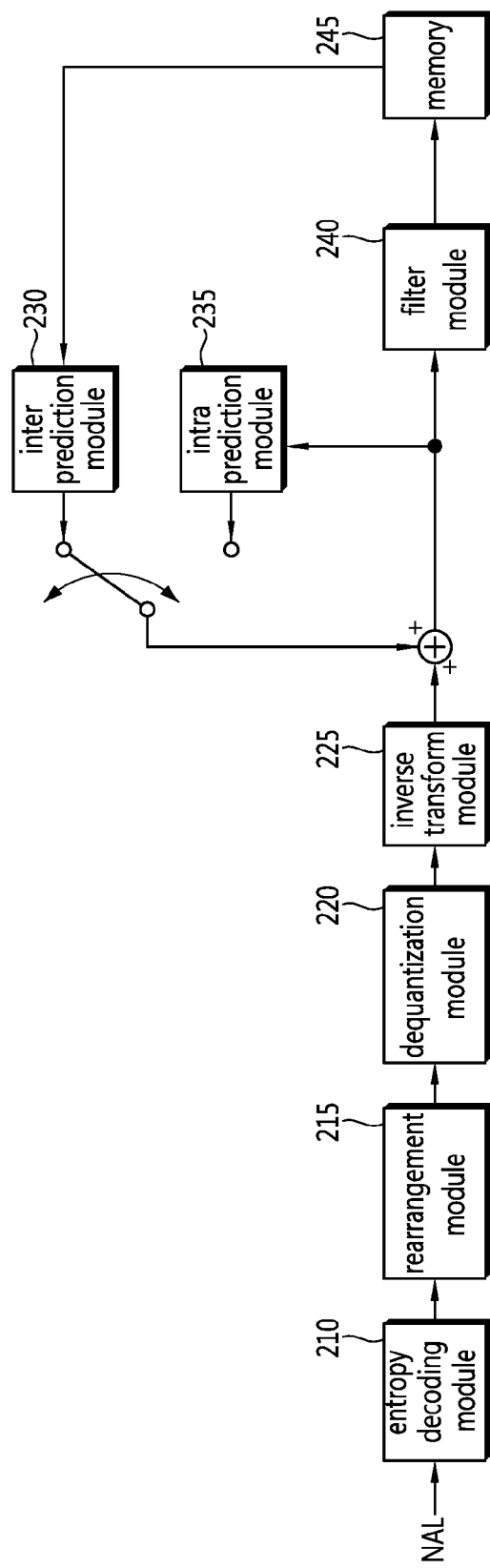
FIG. 2 is a block diagram illustrating a video decoding apparatus according to an exemplary embodiment of the present invention.

FIG. 2 is a block diagram illustrating a video decoding apparatus according an exemplary embodiment of the present invention.

Referring to FIG. 2, the video decoding apparatus 200 may include an entropy decoding module 210, a rearrangement module 215, a dequantization module 220, an inverse transform module 225, a prediction module 230, a filter module 235, and a memory 240.

When a video bitstream is input from the video encoding apparatus, the input bitstream may be decoded according to an inverse process of the video encoding process by the video encoding apparatus.

The entropy decoding module 210 may perform entropy decoding according to an inverse process of the entropy encoding process by the entropy encoding module of the video encoding apparatus. For example, the same VLC table as used for entropy encoding in the video encoding apparatus may be used to perform entropy decoding. Information for generating a prediction block among information decoded in the entropy decoding module 210 may be provided to the prediction module 230, and residual values obtained via entropy decoding by the entropy decoding module may be input to the rearrangement module 215.

Like the entropy encoding module, the entropy decoding module 210 may also change a codeword assignment table using a counter or direct swapping method and perform entropy decoding based on the changed codeword assignment table.

The entropy decoding module 210 may decode information associated with intra prediction and inter prediction performed by the encoding apparatus. As described above, when the video encoding apparatus has predetermined constraints in performing intra prediction and inter prediction, the entropy decoding module may perform entropy decoding based on the constraints to obtain information on intra prediction and inter prediction of a current block.

The rearrangement module 215 may perform rearrangement on the bitstream entropy-decoded by the entropy decoding module 210 on the basis of the rearrangement method of the encoding module. The rearrangement module 215 may reconstruct and rearrange coefficients expressed in a 1D vector form into coefficients in a 2D block. The rearrangement module 215 may be provided with information associated with coefficient scanning performed by the encoding module and may perform rearrangement using a method of inversely scanning the coefficients on the basis of scanning order by which scanning is performed by the encoding module.

The dequantization module 220 may perform dequantization on the basis of a quantization parameter provided from the encoding apparatus and the rearranged coefficients of the block.

The inverse transform module 225 may perform inverse DCT and inverse DST with respect to DCT and DST performed by the transform module, where the DCT and DST have been performed on the result of quantization by the video encoding apparatus. Inverse transform may be performed on the basis of a transfer unit determined by the video encoding apparatus. The transform module of the video encoding apparatus may selectively perform DCT and DST depending on a plurality of information elements, such as a prediction method, a size of the current block and a prediction direction, etc, and the inverse transform module 225 of the video decoding apparatus may perform inverse transform on the basis of information on the transform performed by the transform module of the video encoding apparatus.

Transform may be performed by a coding unit instead of by a transform unit.

An intra prediction mode for a current transform unit may be divided into a first intra prediction mode group including a vertical prediction mode, a second intra prediction mode group including a horizontal prediction mode, and a third intra prediction mode group including any directional prediction mode other than the first intra prediction mode group and the second intra prediction mode group. The inverse transform module 225 may determine an intra prediction mode group and perform inverse transformation using different transform methods depending on intra prediction mode groups.

In decoding a transform method, the transform method is decoded using a first mapping table when the intra prediction mode group is the first intra prediction mode group, the transform method is decoded using a second mapping table when the intra prediction mode group is the second intra prediction mode group, and the transform method is decoded using a third mapping table when the intra prediction mode group is the third intra prediction mode group.

The prediction module 230 may generate a predicted block on the basis of predicted block generation information provided from the entropy decoding module 210 and information on a previously-decoded block or picture provided from the memory 240.

Similarly to the operation of the video encoding apparatus as described above, when a prediction unit and a transform unit have the same size in performing intra prediction, intra prediction on the prediction unit is performed based on left pixels, an upper-left pixel and upper pixels of the prediction unit. On the other hand, when a prediction unit and a transform unit have different sizes in performing intra prediction, intra prediction may be performed using reference pixels based on the transform unit. Intra prediction with N×N partitioning may be performed only on a minimum coding unit.

The prediction module 230 may include a prediction unit determination module, an inter prediction module and an intra prediction module. The prediction unit determination module may receive a variety of information, such as prediction unit information, prediction mode information of an intra prediction method and motion prediction-related information of an inter prediction method input from the entropy decoding module, may determine a prediction unit in a current coding unit, and may determine which of the inter prediction and the intra prediction is performed on the prediction unit. The inter prediction module may perform inter prediction on a current prediction unit based on information of at least one picture among a previous picture and a subsequent picture of a current picture including the current prediction unit using information necessary for inter prediction of the current prediction unit provided from the video encoding apparatus.

In order to perform inter prediction, it may be determined on the basis of a coding unit whether a motion prediction method for a prediction unit included in the coding unit is a skip mode, a merge mode or an AMVP mode.

The intra prediction module may generate a predicted block on the basis of pixel information in a current picture. When a prediction unit is a prediction unit on which intra prediction is performed, intra prediction may be performed based on intra prediction mode information on the prediction unit provided from the video encoding apparatus. The intra prediction module may include an MS filter, a reference pixel interpolation module, and a DC filter. The AIS filter performs filtering on reference pixels of a current block, and whether to apply the AIS filter may be determined depending on a prediction mode of the current prediction unit. AIS filtering may be performed on the reference pixels of the current block using the prediction mode of the prediction unit and information on the AIS filter provided from the video encoding apparatus. When the prediction mode of the current block is a mode not involving AIS filtering, the AIS filter may not be applied.

When the prediction mode of the prediction unit is a prediction mode of performing intra prediction on the basis of pixel values obtained by interpolating the reference pixels, the reference pixel interpolation module may generate reference pixels in a pixel unit of less than an integer position unit by interpolating the reference pixels. When the prediction mode of the current prediction unit is a prediction mode of generating a predicted block without interpolating the reference pixels, the reference pixels may not be interpolated. The DC filter may generate a predicted block through filtering when the prediction mode of the current block is the DC mode.

The reconstructed block or picture may be provided to the filter module 235. The filter module 235 may include a deblocking filter, an offset correction module, and an ALF.

Information on whether the deblocking filter is applied to a corresponding block or picture and information on which of a strong filter and a weak filter is applied when the deblocking filter is used may be provided from the video encoding apparatus. The deblocking filter of the video decoding apparatus may be provided with information on the deblocking filter from the video encoding apparatus and may perform deblocking filtering on a corresponding block. Similarly to the video encoding apparatus, vertical deblocking filtering and horizontal deblocking filtering are performed first, in which at least one of vertical deblocking filtering and horizontal deblocking filtering may be performed on an overlapping region. Either of vertical deblocking filtering and horizontal deblocking filtering which is not previously performed may be performed on the region in which vertical deblocking filtering and horizontal deblocking filtering overlap. This deblocking filtering process may enable parallel processing of deblocking filtering.

The offset correction module may perform offset correction on the reconstructed picture on the basis of an offset correction type and offset value information applied to the picture in the encoding process.

The ALF may perform filtering on the basis of a comparison result between the reconstructed picture after filtering and the original picture. The ALF may be applied to a coding unit on the basis of information on whether the ALF is applied or not, and ALF coefficient information provided from the encoding apparatus. The ALF information may be included and provided in a specific parameter set.

The memory 240 may store the reconstructed picture or block for use as a reference picture or a reference block, and may provide the reconstructed picture to an output module.

As described above, in the embodiments of the invention, the term "coding unit" is used as an encoding unit and may be also used as a unit of decoding (decoding unit).

Figure 3:
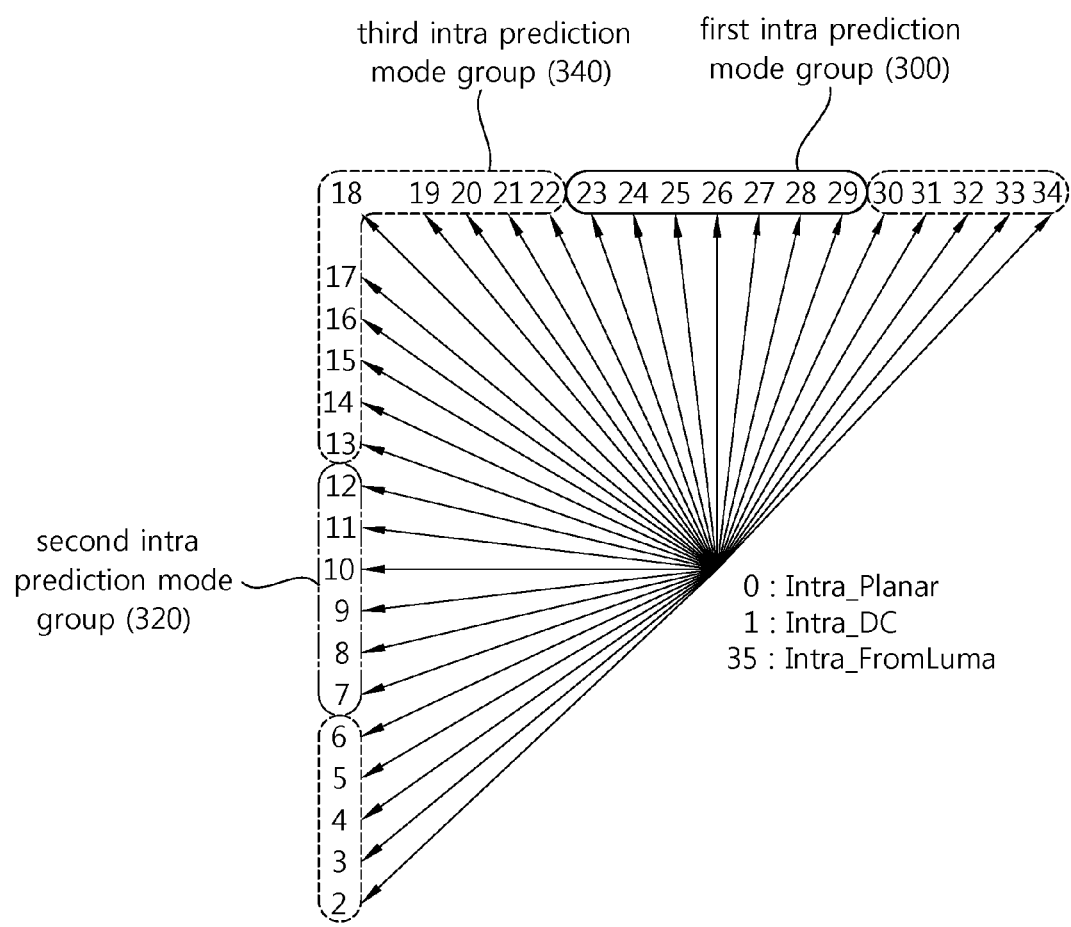
FIG. 3 illustrates a method of changing a transform method depending on an intra prediction mode according to an exemplary embodiment of the present invention.

FIG. 3 illustrates a method of changing a transform method depending on an intra prediction mode according to an exemplary embodiment of the present invention.

Referring to FIG. 3, different transform methods may be used depending on direction of an intra prediction mode.

A first intra prediction mode group 300 includes a vertical intra prediction mode 26 and adjacent modes 23, 24, 25, 27, 28 and 29. A second intra prediction mode group 320 includes a horizontal intra prediction mode 10 and adjacent modes 13, 12, 11, 9, 8 and 7. A third intra prediction mode group 340 includes diagonal prediction modes other than the first intra prediction mode group 300 and the second intra prediction mode group 320.

The first intra prediction mode group 300, the second intra prediction mode group 320 and the third intra prediction mode group 340 have values set at random. In the transform method depending on the intra prediction mode according to the present embodiment, other prediction modes may be included in the corresponding groups. That is, the first intra prediction mode group 300 represents a group including intra prediction modes with a high vertical prediction tendency and the second intra prediction mode group 320 represents a group including intra prediction modes with a high horizontal prediction tendency. An intra prediction mode included in a corresponding group may be changed within the scope of the present invention.

That is, in the transform method according to the present embodiment, intra prediction modes are divided into groups and different transform methods are applied depending on the groups, in which intra prediction modes may also be divided into a plurality of groups, instead of three groups, and different transform methods may be applied depending on the groups.

Figure 4:
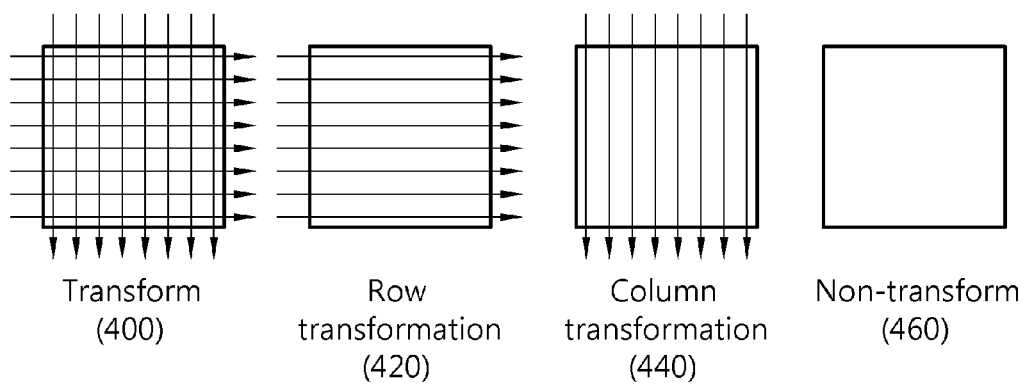
FIG. 4 illustrates a transform method according to an exemplary embodiment of the present invention.

FIG. 4 illustrates a transform method according to an exemplary embodiment of the present invention.

Referring to FIG. 4, four transform methods may be used to transform a residual signal.

The transform methods to be mentioned below may be classified according to whether row transformation and column transformation are performed on a block. In decoding process, inverse transform may be performed with respect to a transform method used for transformation in encoding process. Hereinafter, the present embodiment illustrates a transform method for encoding process only for convenience of description. In decoding process, inverse transform may be carried out on the basis of the transform method in encoding process.

A first transform method 400 performs both row transformation and column transformation, and may perform 2-directional (2D) transformation on a block. A second transform method 420 performs row transformation only, and may perform 1-directional (1D) transformation on a block in a row direction. A third transform method 440 performs column transformation only, and may perform 1-directional transformation on a block in a column direction.

A fourth transform method 460 may perform neither row nor column transformation. The fourth transform method may be expressed based on predetermined flag information, the flag information may specify that transformation is not perform on a current block. Further, in encoding process, information on whether a non-transform (transform skip) method such as the fourth transform method is used for an entire encoding process may be indicated with additional flag information.

In the present embodiment, only some of the first to fourth transform methods may be selectively used, instead of using all first to fourth transform methods. For example, the fourth transform method that is a non-transform method may be selectively used using flag information. That is, in transforming a block, only the first to third transform methods may be used and the fourth transform method may be selectively used. Alternatively, when only the first transform method and the fourth transform method are used, only the first transform method may be selectively used using flag information, or the first transform method or both the first transform method and the fourth transform method may be used.

Table 1 shows the transform methods and codewords representing the transform methods.

TABLE 1

| Transform method | Row transformation | Column transformation | Codeword | |
|---|---|---|---|---|
| First transform method | 0 | 0 | 1 | 2D transform |
| Second transform method | 0 | — | 01 | 1D transform |
| Third transform method | — | 0 | 001 | 1D transform |
| Fourth transform method | — | — | 000 | Non-transform |

In the transform method according to the present embodiment, different transform methods may be applied depending on intra prediction modes.

Figure 5:
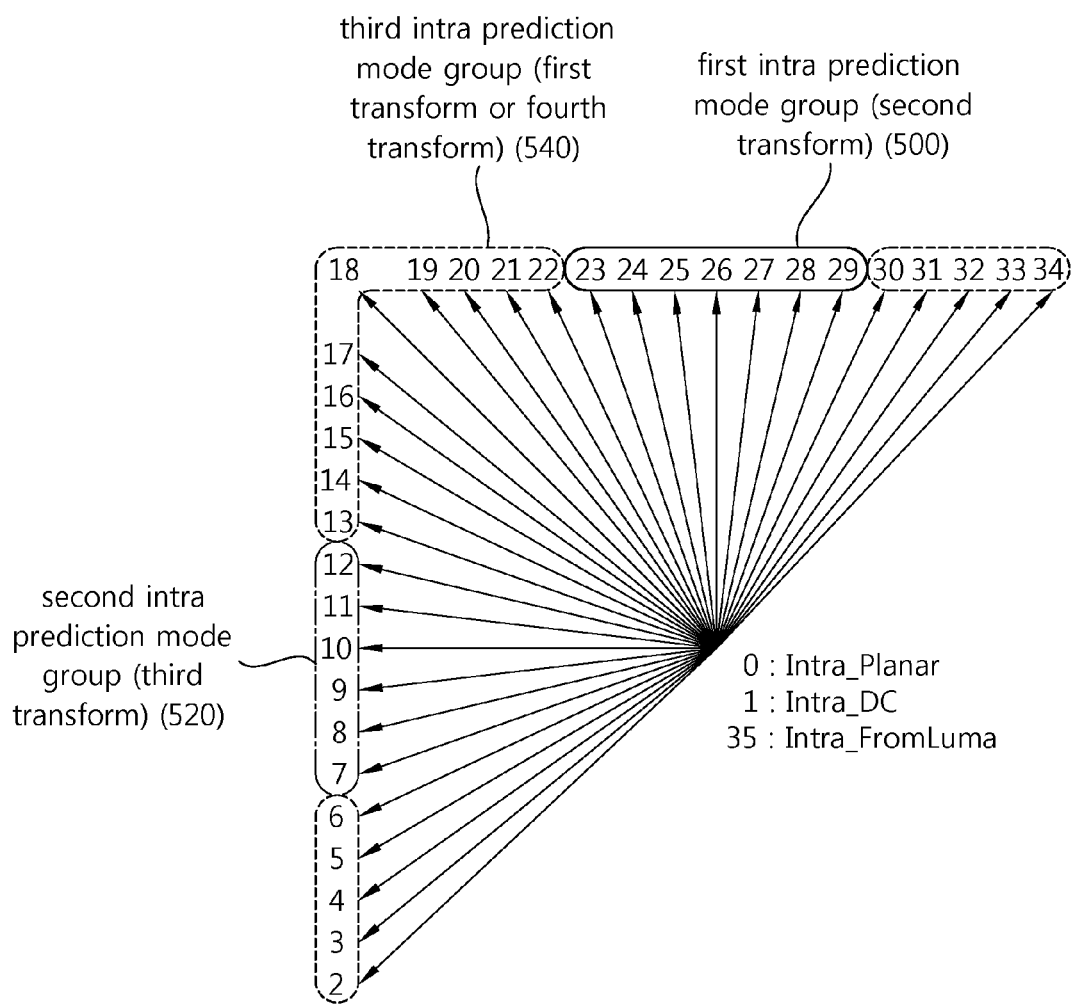
FIG. 5 illustrates a transform method depending on an intra prediction mode according to an exemplary embodiment of the present invention.

FIG. 5 illustrates a transform method depending on an intra prediction mode according to an exemplary embodiment of the present invention.

For convenience of description, the following embodiment shows that intra prediction modes are classified into three intra predictions mode groups and different transform methods are used for the respective groups. However, this embodiment is provided as an illustrative example only to show that intra prediction modes are divided into a plurality of prediction mode groups and a transform method is applied based on the divided groups. Alternative embodiments illustrating that intra prediction modes are divided into a plurality of prediction mode groups and a transform method may be applied based on the divided groups fall within the scope of the present invention.

Referring to FIG. 5, a first intra prediction mode group 500 including a vertical prediction mode and adjacent prediction modes may use the second transform method of performing 1D transformation in the row direction.

A second intra prediction mode group 520 including a horizontal prediction mode and adjacent prediction modes may use the third transform method of performing 1D transformation in the column direction.

A third intra prediction mode group 540 may perform transform using either the first transform method of performing 2D transformation in both row and column directions or the fourth transform method of not performing transform in any direction.

A DC mode or planar mode as a non-directional mode may select and use a transform method with a small rate-distortion optimization (RDO) value among the first to fourth transform methods.

In decoding process, the same transform method used for encoding process may be used to perform inverse transform for a prediction mode group.

That is, according to the present embodiment, (1) In encoding process, intra prediction mode information may be derived and a transform method may be selectively used based on the derived intra prediction mode information. The intra prediction mode information may be information indicating in which prediction mode group the intra prediction mode is included;

(2) In decoding process, the intra prediction mode information may be decoded. Inverse transform may be performed based on the decoded intra prediction mode information using a transform method used for encoding process, thereby reconstructing a block.

Figure 6:
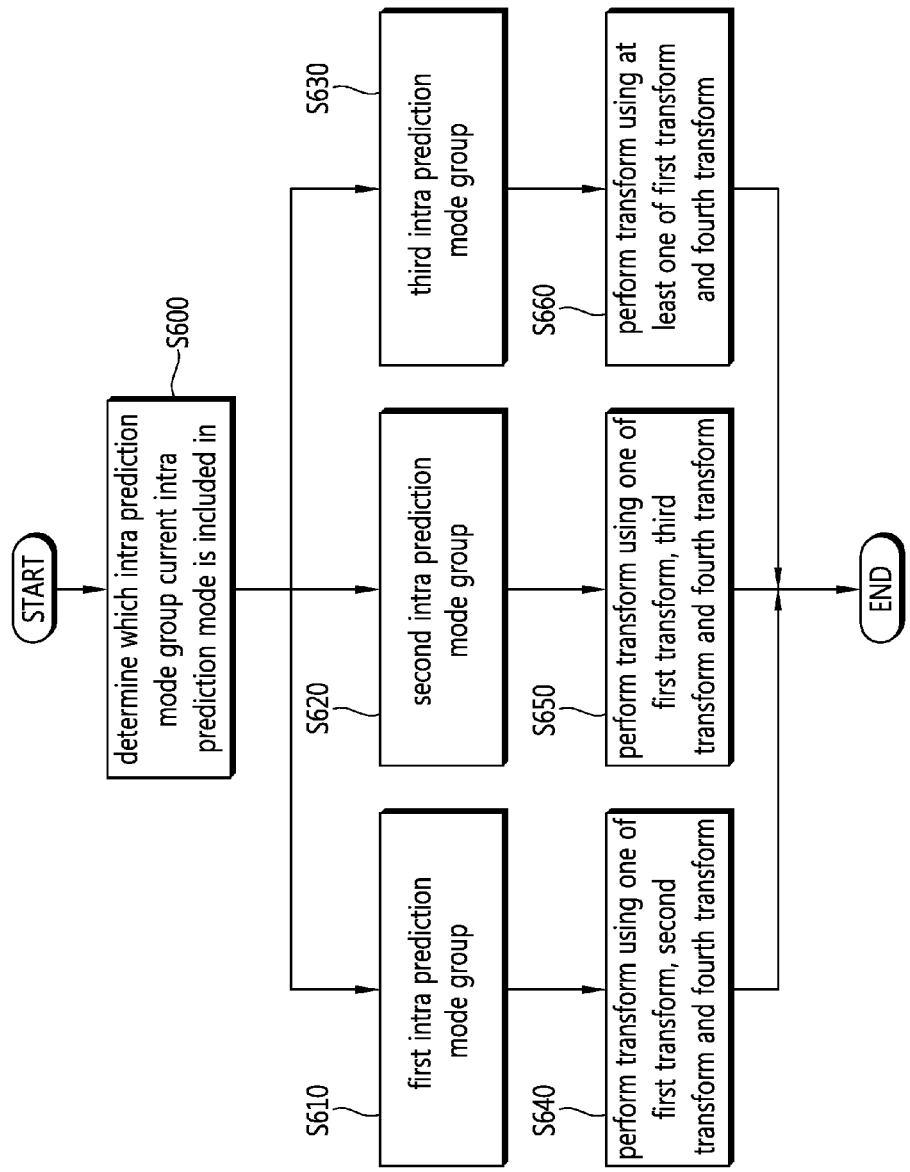
FIG. 6 is a flowchart illustrating a method of selecting a different transform method depending on an intra prediction mode according to an exemplary embodiment of the present invention.

FIG. 6 is a flowchart illustrating a method of selecting a different transform method depending on an intra prediction mode according to an exemplary embodiment of the present invention.

Hereinafter, FIG. 6 illustrates a method of selectively using some of the transform methods depending on an intra prediction mode according to an exemplary embodiment.

Referring to FIG. 6, it is determined which intra prediction mode group a current intra prediction mode is included in (S600).

In the first intra prediction mode group (S610), the third transform method of performing 1D transformation only in the column direction is less likely to have best performance in view of RDO. Thus, in performing intra prediction, transform may be performed using at least one of the first transform method, the second transform method and the fourth transform method, other than the third transform method, to compare RDO. Among these transform methods, a transform method with best performance may be selected as a transform method for a current transform unit to perform transform (S640).

In the second intra prediction mode group (S620), the second transform method of performing 1D transformation only in the row direction is less likely to have best performance in view of RDO. Thus, in performing intra prediction, transform may be performed using at least one of the first transform method, the third transform method and the fourth transform method, other than the second transform method, to compare RDO. Among these transform methods, a transform method with best performance may be selected as a transform method for a current transform unit to perform transform (S650).

In the third intra prediction mode group (S630), transform may be performed using one selected of the first transform method and the fourth transform method, other than the second transform method of performing 1D transformation in the row direction and the third transform method of performing 1D transformation in the column direction (S660).

Tables 2 to 4 illustrate different sets of transform methods to be used for the respective intra prediction mode groups according to the exemplary embodiment of the present invention.

TABLE 2

| Transform method | Row transformation | Column transformation | Codeword | |
|---|---|---|---|---|
| First transform method | 0 | 0 | 0 | 2D transform |
| Second transform method | 0 | — | 10 | 1D transform |
| Fourth transform method | — | — | 11 | |

Table 2 illustrates a set of transform methods used for the first intra prediction mode group, in which one of the three transform methods other than the third transform method of performing only column transformation may be selectively used.

TABLE 3

| Transform method | Row transformation | Column transformation | Codeword | |
|---|---|---|---|---|
| First transform method | 0 | 0 | 0 | 2D transform |
| Third transform method | — | 0 | 10 | 1D transform |
| Fourth transform method | — | — | 11 | |

Table 3 illustrates a set of transform methods used for the second intra prediction mode group, in which one of the three transform methods other than the second transform method of performing only row transformation may be selectively used.

TABLE 4

| Transform method | Row transformation | Column transformation | Codeword | |
|---|---|---|---|---|
| First transform method | 0 | 0 | 0 | 2D transform |
| Fourth transform method | — | — | 1 | |

Table 4 illustrates a set of transform methods used for the third intra prediction mode group, in which one of the two transform methods other than the second transform method of performing only row transformation and the third transform method of performing only column transformation may be selectively used.

The foregoing embodiment is provided for illustrative purposes only, and a mapping relationship between an intra prediction mode group and a transform method may be changed variously.

Figure 7:
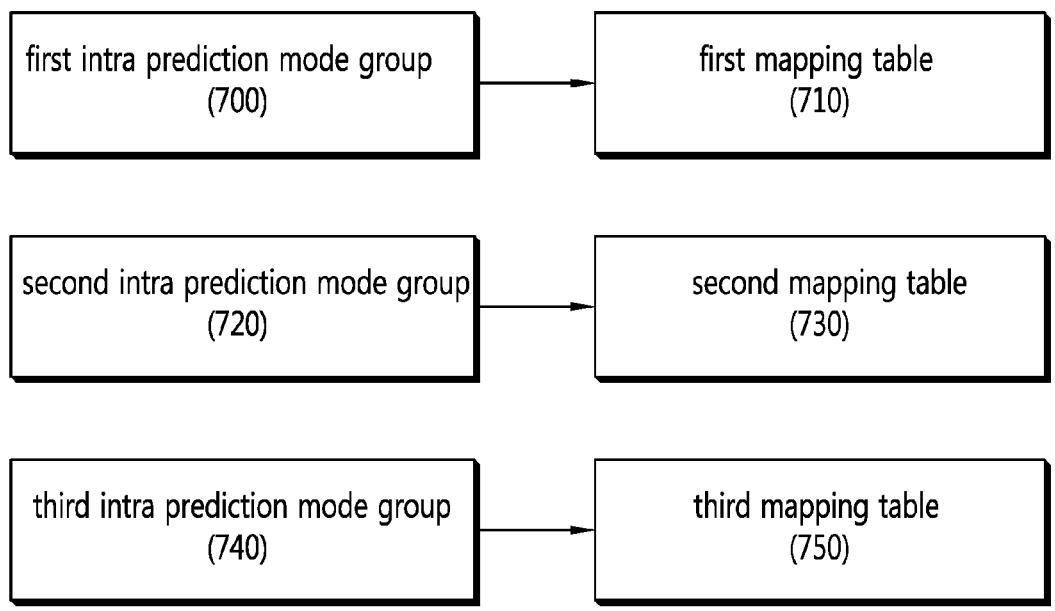
FIG. 7 illustrates a method of reallocating a codeword depending on an intra prediction mode according to an exemplary embodiment of the present invention.

FIG. 7 illustrates a method of reassigning a codeword depending on an intra prediction mode according to an exemplary embodiment of the present invention.

Referring to FIG. 7, codewords which are assigned to transform methods may vary according to intra prediction mode groups.

Since a first intra prediction mode group 700 is more likely to use the second transform method of performing only row transformation, the second transform method is assigned to a shorter codeword than the third transform method to enhance encoding efficiency. Alternatively, a codeword which is assigned to the second transform method is mapped to a shortest codeword and a codeword which is assigned to the third transform method is mapped to a longest codeword, thereby enhancing encoding efficiency.

In this way, the first intra prediction mode group 700, a second intra prediction mode group 720 and a third intra prediction mode group 740 may perform encoding according to codewords using different mapping tables, a first mapping table 710, a second mapping table 730 and a third mapping table 750, respectively. That is, different codewords are mapped with transform methods depending on intra prediction mode groups, thereby enhancing encoding and decoding efficiency.

Table 5 illustrates codewords mapped with the respective transform methods for the second intra prediction mode group.

TABLE 5

| Transform method | Row transformation | Column transformation | Codeword | |
|---|---|---|---|---|
| First transform method | 0 | 0 | 0 | 2D transform |
| Second transform method | 0 | — | 001 | 1D transform |
| Third transform method | — | 0 | 01 | 1D transform |
| Fourth transform method | — | — | 000 | |

Referring to Table 5, since the second intra prediction mode group is more likely to select the third transform method of performing column transformation as an optimal method than the second transform method, the third transform method may be assigned to a shorter codeword than a codeword assigned to the second transform method.

Figure 8:
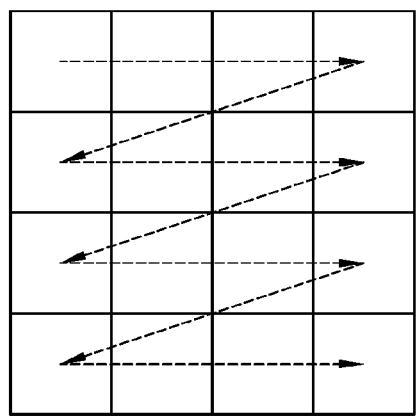
FIG. 8 illustrates a scanning mode depending on a transform method according to an exemplary embodiment of the present invention.
Figure 8:
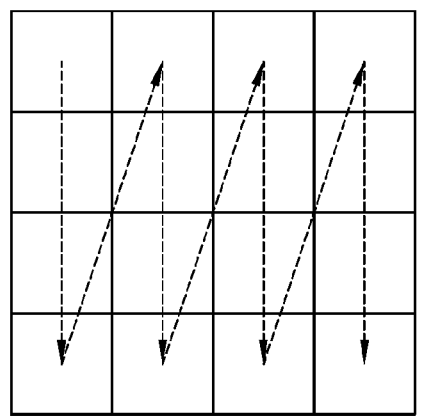
Figure 8:
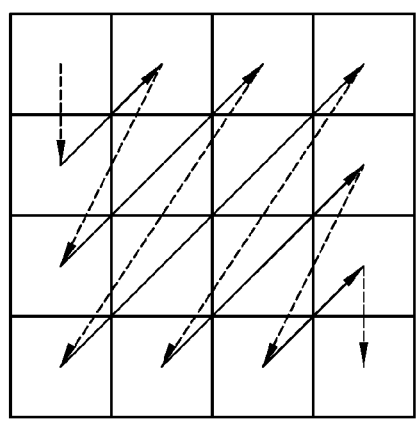
Figure 8:
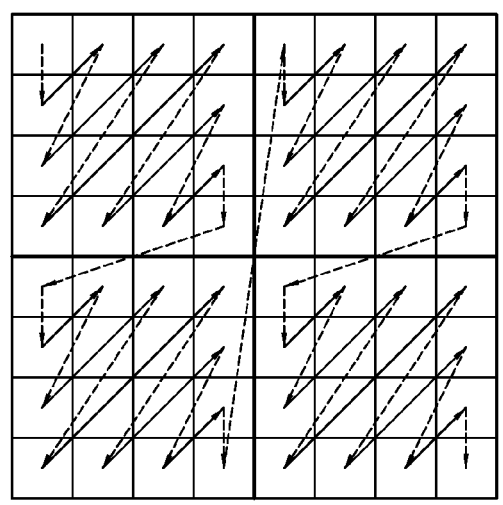

FIG. 8 illustrates a scanning mode depending on a transform method according to an exemplary embodiment of the present invention.

Referring to FIG. 8, scanning mode may include horizontal scanning order 800, vertical scanning order 820 and diagonal scanning orders 840 and 880. In diagonal scanning, different diagonal scanning orders may be used depending on block sizes. Diagonal scanning order 840 may be used for a 4×4 block, while diagonal scanning order 860 may be used for a block larger than a 4×4 block. The scanning orders shown in FIG. 8 are provided only for illustrative purposes, and alternative scanning orders may be also used.

According to the present embodiment, different scanning orders may be used depending on intra prediction modes and sizes of blocks. For example, information on a scanning order used for a block may be obtained using a mapping table representing a mapping relationship between an intra prediction mode and a block size and scanning order based on input values of an intra prediction mode and a block size.

Further, different scanning orders may be used depending on not only information on intra prediction modes and sizes of blocks but also transform methods to arrange coefficients. For example, in the second transform method of performing only row transformation, residual signals are more likely to remain in the vertical direction, and thus vertical scanning order 820 may be used. In the third transform method of performing only column transformation, residual signal are more likely to remain in the row direction, and thus horizontal scanning order 800 may be used. In the transform method of performing both row transformation and column transformation, diagonal scanning order 840 may be used to transform residual signals.

Figure 9:
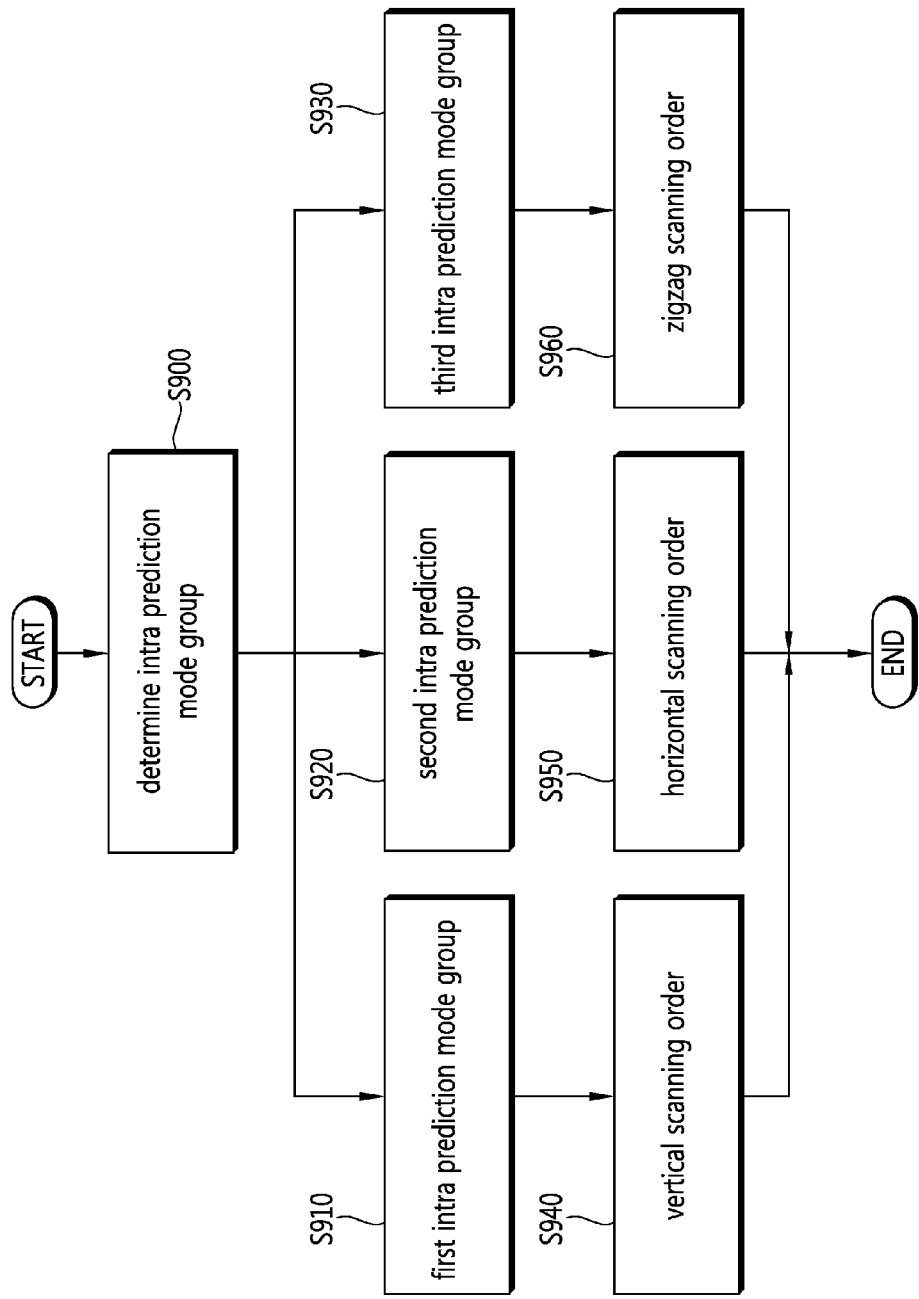
FIG. 9 is a flowchart illustrating a method of determining a scanning mode depending on a transform method according to an exemplary embodiment of the present invention.

FIG. 9 is a flowchart illustrating a method of determining a scanning mode depending on a transform method according to an exemplary embodiment of the present invention.

FIG. 9 illustrates a method of determining a scanning order depending on an intra prediction mode such as intra prediction mode group information. Similarly, as a transform method is determined depending on an intra prediction mode group, the method of determining the scanning order depending on the transform method may be also included in the present embodiment.

Referring to FIG. 9, an intra prediction mode group is determined (S900).

As transform is performed based on an intra prediction mode group, information on an intra prediction mode used for a current transform unit is determined and an intra prediction mode group is determined accordingly.

In the first intra prediction mode group (S910), the second transform method may be used and vertical (column direction) scanning order may be used for transformed residual information (S940).

In the second intra prediction mode group (S920), the third transform method may be used and horizontal (row direction) scanning order may be used for transformed residual information (S950).

In the third intra prediction mode group (S930), the first transform method may be used and zigzag (diagonal) scanning order may be used for transformed residual information (S960).

Although FIG. 9 illustrates that a scanning order is determined for a block depending on three divided groups of intra prediction modes, intra prediction modes may be further divided into a greater number of groups within the scope of the present invention.

Also, as described above, not only the information on the intra prediction mode but a size of a block to be scanned may also be used as a factor for determining a scanning order of a block.

In encoding process, an intra prediction mode may be determined and a scanning order may be determined depending on the determined intra prediction mode. Intra prediction modes may be divided into a plurality of groups and a scanning order may be determined for each corresponding group.

In decoding process, a scanning order may be determined based on an intra prediction mode determined in encoding process, and a block may be reconstructed using the same scanning order as used for encoding process. Likewise in decoding process, intra prediction modes may be divided into a plurality of groups and a scanning order may be determined for each corresponding group.

Also, in decoding process, information on a scanning order used in encoding process may be derived based on decoded intra prediction mode information and block size information. In decoding process, scanning may be performed based on the derived information on the scanning method used in encoding process and the same block as in encoding process may be generated.

Figure 10:
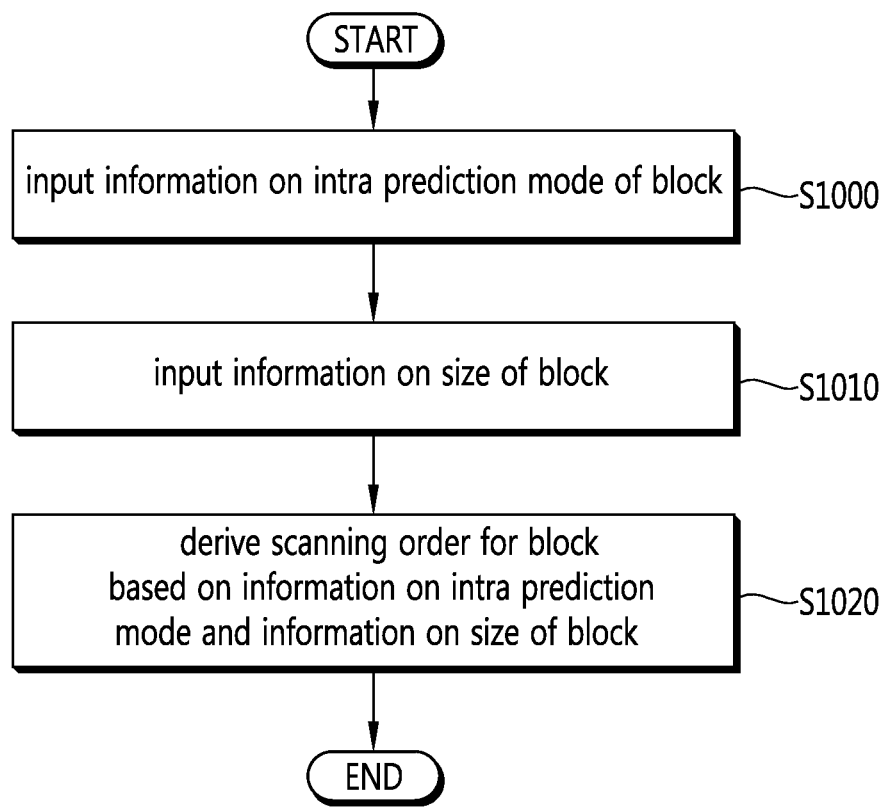
FIG. 10 is a flowchart illustrating a method of determining a scanning mode depending on a transform method according to an exemplary embodiment of the present invention.

FIG. 10 is a flowchart illustrating a method of determining a scanning mode depending on a transform method according to an exemplary embodiment of the present invention.

FIG. 10 is a flowchart illustrating a method of determining a scanning mode based on block size information in addition to intra prediction mode information.

Referring to FIG. 10, information on an intra prediction mode of a block is input (S1000).

Information on an intra prediction mode number may be input, or index information on a corresponding group may be input if the intra prediction mode number is included in a predetermined group.

Information on a size of the block is input (S1010).

The information on the size of the block may be further considered to determine a scanning order in addition to the information on the intra prediction mode. That is, even in performing intra prediction on blocks using the same intra prediction mode number, different scanning orders may be used depending on sizes of the blocks.

A scanning order of the block is derived based on the information on the intra prediction mode and the information on the size of the block (S1020). A method of scanning the block may be derived on the basis of the information on the intra prediction mode and scanning information input through S1000 and S1010.

In encoding process, a scanning order for a block may be derived by determining an intra prediction mode and a size of a block in a prediction process. In decoding process, a scanning order for a block may be derived based on the entropy-decoded information on an intra prediction mode and information on a size of a block.

While exemplary embodiments of the present invention have been shown and described, it would be appreciated by those skilled in the art that various changes may be made to these exemplary embodiments without departing from the principles and spirit of the invention.

The invention claimed is:

1. A method of decoding a video signal having a current block to be decoded with a decoding apparatus, comprising:
   obtaining prediction samples of the current block by performing intra prediction for the current block based on intra prediction mode of the current block, the intra prediction mode of the current block being determined based on intra prediction mode of neighboring block adjacent to the current block;
   obtaining residual samples of the current block;
   obtaining reconstruction samples of the current block by using the residual samples and the prediction samples; and
   applying a deblocking filter to the reconstruction samples,
   wherein obtaining the residual samples comprises:
      obtaining quantized coefficients of the current block from the video signal,
      obtaining inverse-quantized coefficients of the current block by inverse-quantizing the quantized coefficients; and
      obtaining, based on a transform skip flag, the residual samples of the current block by selectively performing an inverse-transform on the inverse-quantized coefficients of the current block, the transform skip flag specifying whether an inverse-transform is performed or skipped on the inverse-quantized coefficients of the current block,
   wherein when the transform skip flag specifies that the inverse-transform is performed on the inverse-quantized coefficients of the current block, obtaining the residual samples further comprises:
   determining, based on a size of the transform block relating to the current block, a transform type of the current block among a discrete cosine transform (DCT) or a discrete sine transform (DST); and
   performing the inverse-transform for the inverse-quantized coefficients of the current block by using the determined transform type.

2. The method of claim 1, wherein the inverse-transform includes a transform on rows of the current block and a transform on columns of the current block.

3. The method of claim 1, wherein the prediction samples of the current block is obtained based on neighboring samples adjacent to the current block, and wherein when the neighboring samples include an unavailable sample which is not used for intra prediction of the current block, the unavailable sample is replaced with at least one of available samples adjacent to the unavailable sample.

4. The method of claim 3, wherein the unavailable sample corresponds to at least one sample in a neighboring block which is the inter-coded block, the neighboring block being adjacent to the current block.

* * * * *